(12) United States Patent
Huang et al.

(10) Patent No.: US 10,435,076 B2
(45) Date of Patent: Oct. 8, 2019

(54) VEHICLE ENGINE COMPARTMENT ASSEMBLY

(71) Applicant: GUANGZHOU AUTOMOBILE GROUP CO., LTD., Guangzhou, Guangdong Province (CN)

(72) Inventors: Xiangdong Huang, Guangzhou (CN); Peng Yue, Guangzhou (CN); Huanquan Yuan, Guangzhou (CN); Furong Geng, Guangzhou (CN); Jinhua Chen, Guangzhou (CN)

(73) Assignee: GUANGZHOU AUTOMOBILE GROUP CO., LTD., Guangzhou, Guangdong Province (CN)

( * ) Notice: Subject to any disclaimer, the term of this patent is extended or adjusted under 35 U.S.C. 154(b) by 14 days.

(21) Appl. No.: 15/577,724

(22) PCT Filed: Nov. 5, 2015

(86) PCT No.: PCT/CN2015/093899
§ 371 (c)(1),
(2) Date: Nov. 28, 2017

(87) PCT Pub. No.: WO2016/192304
PCT Pub. Date: Dec. 8, 2016

(65) Prior Publication Data
US 2018/0154943 A1    Jun. 7, 2018

(30) Foreign Application Priority Data

May 29, 2015 (CN) .......................... 2015 1 0290031

(51) Int. Cl.
*B60N 99/00* (2006.01)
*B62D 21/15* (2006.01)
(Continued)

(52) U.S. Cl.
CPC ............. *B62D 21/155* (2013.01); *B60R 19/34* (2013.01); *B62D 21/02* (2013.01); *B62D 21/11* (2013.01);
(Continued)

(58) Field of Classification Search
CPC ...... B62D 21/155; B62D 21/02; B62D 21/11; B62D 21/15; B62D 25/082; B62D 25/10; B60R 19/34
See application file for complete search history.

(56) References Cited

U.S. PATENT DOCUMENTS

2010/0171340 A1* 7/2010 Yasuhara ............... B62D 21/11
296/205
2011/0304174 A1   12/2011 Iammarino et al.
(Continued)

FOREIGN PATENT DOCUMENTS

CN          201040541 Y       3/2008
CN          101450685 A       6/2009
(Continued)

*Primary Examiner* — Lori L Lyjak
(74) *Attorney, Agent, or Firm* — Cheng-Ju Chiang

(57) ABSTRACT

A vehicle engine compartment assembly includes an upper longitudinal beam and a front subframe disposed under the upper longitudinal beam. The vehicle engine compartment assembly further includes a middle longitudinal beam and a connecting supporting member. The middle longitudinal beam is disposed between the upper longitudinal beam and the front subframe. The connecting supporting member is connected to each of the middle longitudinal beam, the upper longitudinal beam and the front subframe. In the vehicle engine compartment assembly, the middle longitudinal beam is added between the upper longitudinal beam and the front subframe, and the upper longitudinal beam, the middle longitudinal beam and the front subframe are connected together to form a stable structure having a shape of "大". When the vehicle suffers collision at a high speed, the (Continued)

impact force is transferred through three load transfer paths to improve the energy absorption effect.

12 Claims, 5 Drawing Sheets

(51) Int. Cl.
  *B62D 25/10* (2006.01)
  *B60R 19/34* (2006.01)
  *B62D 21/02* (2006.01)
  *B62D 21/11* (2006.01)
  *B62D 25/08* (2006.01)

(52) U.S. Cl.
  CPC ........... *B62D 21/15* (2013.01); *B62D 25/082* (2013.01); *B62D 25/10* (2013.01)

(56) References Cited

U.S. PATENT DOCUMENTS

| 2013/0320710 A1 | 12/2013 | Watanabe | |
|---|---|---|---|
| 2014/0035325 A1* | 2/2014 | Naito | B62D 25/085 |
| | | | 296/203.02 |
| 2015/0097351 A1* | 4/2015 | Rosepiler | B60G 21/0551 |
| | | | 280/124.152 |

FOREIGN PATENT DOCUMENTS

| CN | 202863556 U | 4/2013 |
|---|---|---|
| CN | 203306103 U | 11/2013 |
| CN | 204775483 U | 11/2015 |
| DE | 4417380 A1 | 11/1995 |
| EP | 1849685 A1 | 10/2007 |
| WO | 2014/097513 A1 | 6/2014 |
| WO | 2014/162573 A1 | 10/2014 |
| WO | 2014/162574 A1 | 10/2014 |

* cited by examiner

VEHICLE ENGINE COMPARTMENT ASSEMBLY

CROSS REFERENCE TO RELATED APPLICATIONS

This application is a 35 U.S.C. § 371 National Phase conversion of International (PCT) Patent Application No. PCT/CN2015/093899, filed on Nov. 5, 2015, which claims priority of Chinese Patent Application No. 201510290031.X, filed by Guangzhou Automobile Group Co., Ltd. on May 29, 2015, and entitled as "vehicle engine compartment assembly". The entire disclosure of the above-identified application is incorporated herein by reference. The PCT International Patent Application was filed and published in Chinese.

FIELD OF THE INVENTION

The present invention relates to the field of vehicle body structure, and more particularly to a vehicle engine compartment assembly.

BACKGROUND OF THE INVENTION

In the field of vehicle, the structural design of engine compartments of vehicle is very important to safety performance of collision. The vehicle engine compartment must be stable and capable of absorbing energy efficiently, when it is collided from different angles or with different overlapping rates. The results of IIHS (Insurance Institute for Highway Safety) small overlap crashtests in recent two years show that, most of cars have poor performance in collision when they are collided from different angles or with different overlapping rates. With the rise of competition, vehicle parts are expected to be interchangeable between different vehicle models. However, for the same engine compartment structure, when it is used in different vehicle models, particularly in vehicle models with different size and weight, there will be a big difference with respect to the collision performance. Therefore, on the premise of maintaining the universality of vehicle parts for engine compartment, how to ensure the collision performance of vehicle, even in IIHS small overlap crashtests, is a large challenge in vehicle structural design.

FIG. 1 is a schematic view showing a traditional engine compartment. As shown in FIG. 1, the engine compartment includes a front bumper 1, an upper longitudinal beam 2, a front subframe 3 and an A-pillar 4. The front bumper 1, the upper longitudinal beam 2 and the front subframe 3 cooperatively form a "人" shaped structure. Rear portions of the upper longitudinal beam 2 and the front subframe 3 are connected to upper and lower portions of the A-pillar 4 to form a "人" shaped structure. The engine compartment has an arc-shaped front longitudinal beam structure connected in large overlapping area with a passenger compartment, which can deform to absorb energy and has stable crumple modes and excellent crashworthiness when subject to head-on collision. However, the engine compartment has disadvantages listed hereinafter.

1. Insufficiency in absorbing energy. The engine compartment has only two load transfer paths, with one load transfer path from the front bumper to the upper longitudinal beam and then to the A-pillar, and the other load transfer path from the front bumper to the front subframe and then to the A-pillar. Thus, the energy absorption requirement for each load transfer path is high, and the structural parts in each load transfer path generally adopt large cross-section or large thickness to meet the energy absorption requirement.

2. Bad performance in crashworthiness collided from different angles. Because the engine compartment has only two load transfer paths, in a side view of the vehicle (i.e., seen from a direction of the width of the vehicle), a distance between the upper longitudinal beam and the subframe cannot be too large to ensure a rigidity and a stability of the engine compartment.

SUMMARY OF THE INVENTION

In view of above, the present invention provides a vehicle engine compartment assembly which has an excellent performance in absorbing energy.

Further, the present invention provides a vehicle engine compartment assembly which can confront collisions from different situations.

The vehicle engine compartment assembly of the present invention includes an upper longitudinal beam and a front subframe disposed under the upper longitudinal beam. The vehicle engine compartment assembly further includes a middle longitudinal beam and a connecting supporting member. The middle longitudinal beam is disposed between the upper longitudinal beam and the front subframe. The connecting supporting member is connected to each of the middle longitudinal beam, the upper longitudinal beam and the front subframe.

According to an embodiment of the present invention, the vehicle engine compartment assembly further includes an energy absorbing box disposed in the front of the upper longitudinal beam and a bumper beam disposed in the front of the energy absorbing box; the bumper beam, the energy absorbing box, the upper longitudinal beam, the middle longitudinal beam, the connecting supporting member and the front subframe cooperatively form a structure having a shape of "木" from a side view of the vehicle.

According to an embodiment of the present invention, the bumper beam, the energy absorbing box, the upper longitudinal beam, the middle longitudinal beam, the connecting supporting member and the front subframe cooperatively form a structure having a shape of "艹" from a top view of the vehicle.

According to an embodiment of the present invention, the upper longitudinal beam is disposed at an outer side of the middle longitudinal beam along a lateral direction of the vehicle.

According to an embodiment of the present invention, a front portion of the upper longitudinal beam protrudes out beyond the middle longitudinal beam along a longitudinal direction of the vehicle, the front portion of the upper longitudinal beam protruding out the middle longitudinal beam and an energy absorbing box of the vehicle are located side by side.

According to an embodiment of the present invention, the upper longitudinal beam includes a first portion, a second portion and a third portion, the first portion is connected to an A-pillar of the vehicle, the third portion is connected to an energy absorbing box of the vehicle, a height of the third portion is lower than a height of the first portion, the second portion is connected between the first portion and the third portion, and the connecting supporting member is connected to the third portion of the upper longitudinal beam.

According to an embodiment of the present invention, the first portion of the upper longitudinal beam is shaped like an inclined line from a side view of the vehicle, the second portion of the upper longitudinal beam is arc-shaped from a side view of the vehicle, and the third portion of the upper longitudinal beam is a horizontal line from a side view of the vehicle.

According to an embodiment of the present invention, the connecting supporting member includes a first connecting portion connected to the upper longitudinal beam, a second connecting portion connected to the middle longitudinal beam, and a third connecting portion connected to the front subframe, the first connecting portion is perpendicular to the second connecting portion, and the first connecting portion is parallel to the third connecting portion.

According to an embodiment of the present invention, the front subframe includes a front crossbar, two longitudinal bars and a rear crossbar, the front crossbar, the longitudinal bars and the rear crossbar cooperatively form a "凵" shaped structure.

According to an embodiment of the present invention, the front subframe further includes a connecting bracket, the connecting bracket is located above a connecting position between the front crossbar and the longitudinal bar, and the front subframe is threadedly connected to the connecting supporting member via the connecting bracket.

In the vehicle engine compartment assembly of the present invention, the middle longitudinal beam is added between the upper longitudinal beam and the front subframe, and the upper longitudinal beam, the middle longitudinal beam and the front subframe are connected via the connecting supporting member, such that the vehicle engine compartment assembly is a stable structure having a shape of "木". When the vehicle suffers collision at a high speed, the impact force is transferred through three load transfer paths to improve the energy absorption effect of the vehicle engine compartment assembly. In addition, since the whole structure of the present invention is stable, a distance between the upper longitudinal beam and the middle longitudinal beam can be designed relatively large, so that the upper longitudinal beam can be located more outside in a lateral direction of the vehicle. Thus, the vehicle engine compartment assembly of the present invention can confront collisions in smaller angles as compared with the prior art. When the vehicle suffers collisions with small overlap ratios or from different angles, at least one of the load transfer paths can absorb the energy adequately, and the structure formed by the upper longitudinal beam, the middle longitudinal beam and the front subframe can distribute the impact force to the other load transfer paths, to thereby improve the bending strength of the upper longitudinal beam, the middle longitudinal beam and the front subframe, such that the force load on the whole structure is more reasonable, and the axial crushing and the energy absorbing performance of the vehicle engine compartment assembly are improved, which is helpful to improve the stability of the passenger compartment and the safety of the vehicle.

DETAILED DESCRIPTION OF PREFERRED EMBODIMENTS

Figure 1:
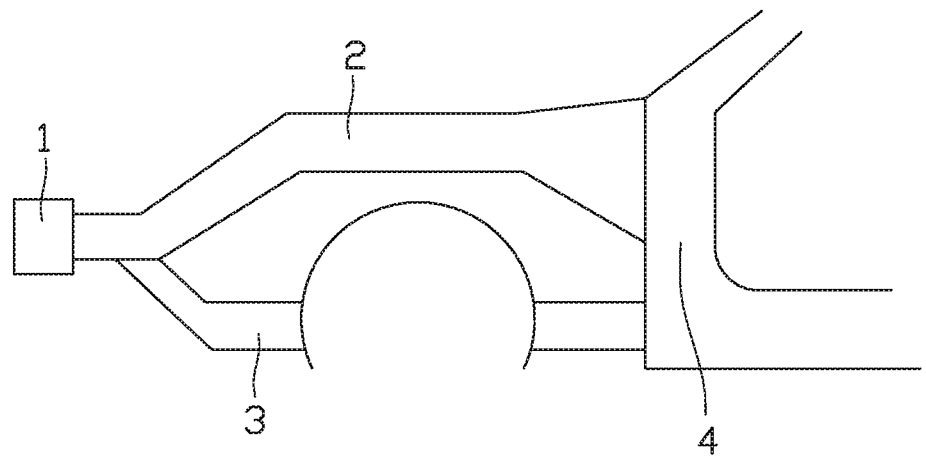
FIG. 1 is a schematic, side view showing a traditional engine compartment.

In order to make the purposes, characteristics, and advantages of the present application more apparently, embodiments of the present application will now be described in more detail with reference to the drawing figures.

Figure 2:
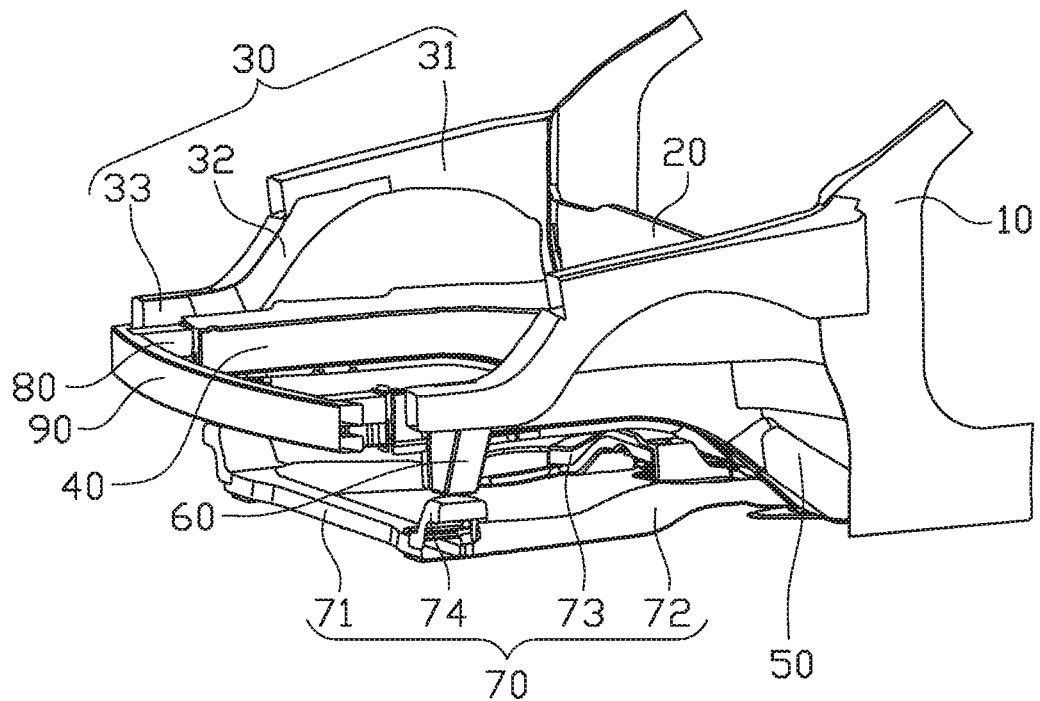
FIG. 2 is a schematic, isometric view showing a vehicle engine compartment assembly according to an embodiment of the present invention.
Figure 3:
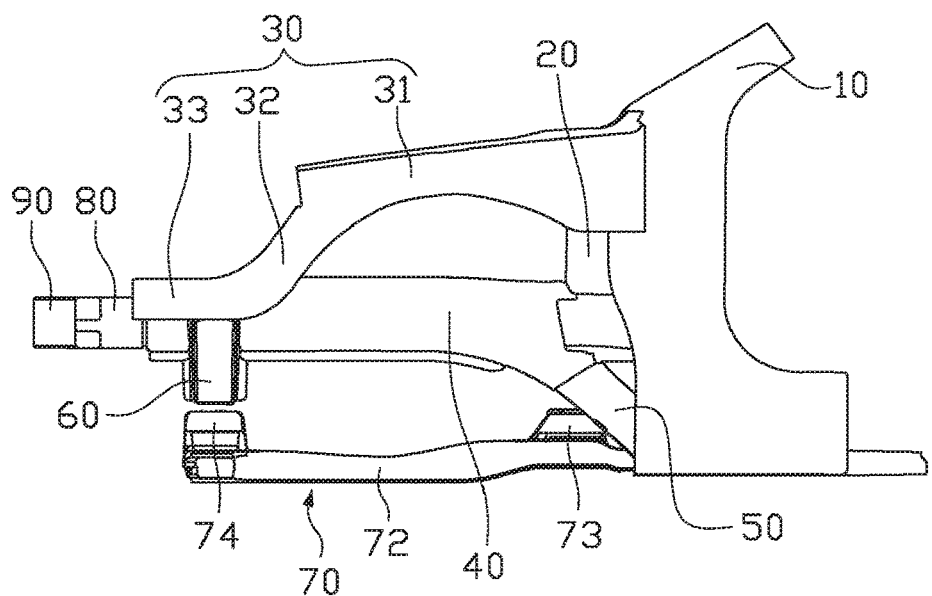
FIG. 3 is a schematic, side view of the vehicle engine compartment assembly of FIG. 2.
Figure 4:
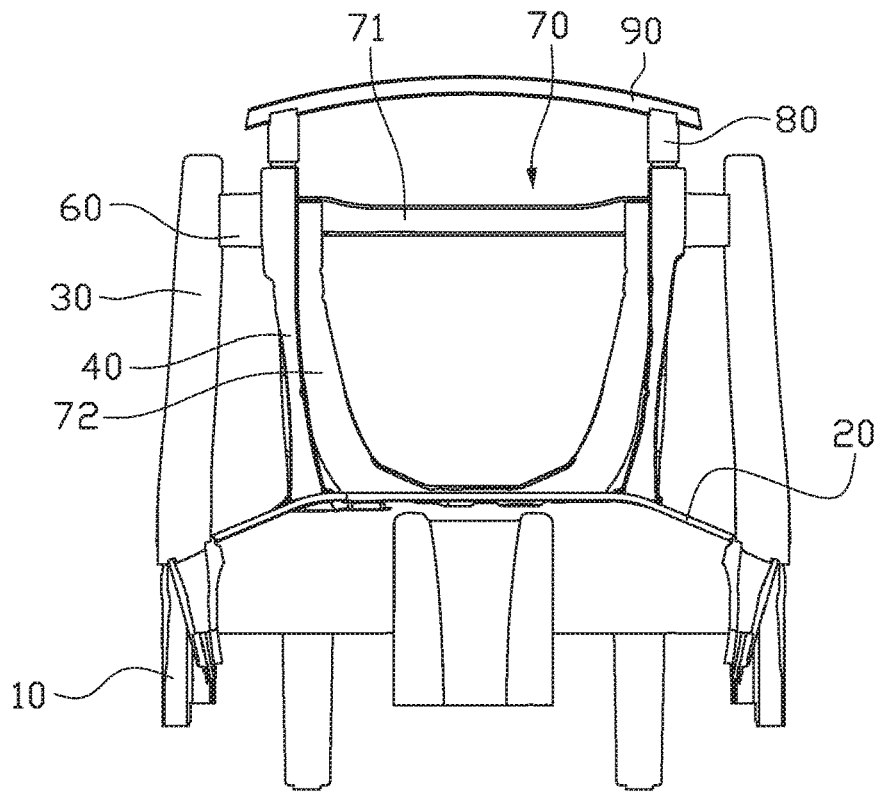
FIG. 4 is a schematic, top view of the vehicle engine compartment assembly of FIG. 2.

Referring to FIG. 2 to FIG. 4, the vehicle engine compartment assembly of the present invention includes an A-pillar 10, a front dash panel 20, an upper longitudinal beam 30, a middle longitudinal beam 40, a floor longitudinal beam 50, a connecting supporting member 60, a front subframe 70, an energy absorbing box 80 and a bumper beam 90.

There are two A-pillars 10 in front of a passenger compartment, the two A-pillars 10 are the main supporting structure of the passenger compartment.

The front dash panel 20 is provided between the two A-pillars 10, for separating an engine compartment from the passenger compartment.

The upper longitudinal beam 30 is welded to a top portion of the A-pillar 10, and extends forward from the top portion of the A-pillar 10 along a longitudinal direction. Particularly, the upper longitudinal beam 30 includes three portions. A first portion 31 of the upper longitudinal beam 30 is shaped like an inclined line from a side view of the vehicle. The first portion 31 extends forward and slightly downwards from the top portion of the A-pillar 10 along the longitudinal direction. A second portion 32 of the upper longitudinal beam 30 is arc-shaped from a side view of the vehicle. The second portion 32 is bent gradually downwards while extending forward from the front end of the first portion 31, such that the first portion 31 and a third portion 33 of the upper longitudinal beam 30 are connected smoothly, and the third portion 33 is lower than the first portion 31 in height. The third portion 33 of the upper longitudinal beam 30 is a horizontal line from a side view of the vehicle, and the third portion 33 extends forward horizontally from the front end of the second portion 32.

In a lateral direction of the vehicle, the middle longitudinal beam 40 is located at an inner side of the upper longitudinal beam 30, and extends along the longitudinal direction of the vehicle engine compartment assembly. The middle longitudinal beam 40 is shaped like a straight line from a side view of the vehicle, and has an inverted L-shaped cross section. A bottom surface of a top plate of the middle longitudinal beam 40 is located on the same plane as a bottom surface of the third portion 33 of the upper longitudinal beam 30.

The floor longitudinal beam 50 is arc-shaped from a side view of the vehicle, and is welded to the rear end of the middle longitudinal beam 40. The floor longitudinal beam 50 extends backwards and downwards from the rear end of the middle longitudinal beam 40 to a position under a floor of the passenger compartment, so that the middle longitudinal beam 40 and the floor of the passenger compartment are smoothly connected via the floor longitudinal beam 50. The floor longitudinal beam 50 is welded together with a bottom portion of the front dash panel 20 and the floor of the passenger compartment.

Along the longitudinal direction, the third portion 33 of the upper longitudinal beam 30 extends forwards beyond a front end of the middle longitudinal beam 40. In the lateral direction of the vehicle, the third portion 33 of the upper longitudinal beam 30 is spaced away by a distance from the middle longitudinal beam 40, so that the third portion 33 of the upper longitudinal beam 30 is suspended at an outer side of the middle longitudinal beam 40. A front end of the middle longitudinal beam 40 is threadedly connected to the energy absorbing box 80, and a front end of the energy absorbing box 80 is welded to the bumper beam 90. An outer wall of the front end of the middle longitudinal beam 40 is connected to the third portion 33 of the upper longitudinal beam 30 via the connecting supporting member 60. A bottom portion of the connecting supporting member 60 is connected to the front subframe 70.

Figure 5:
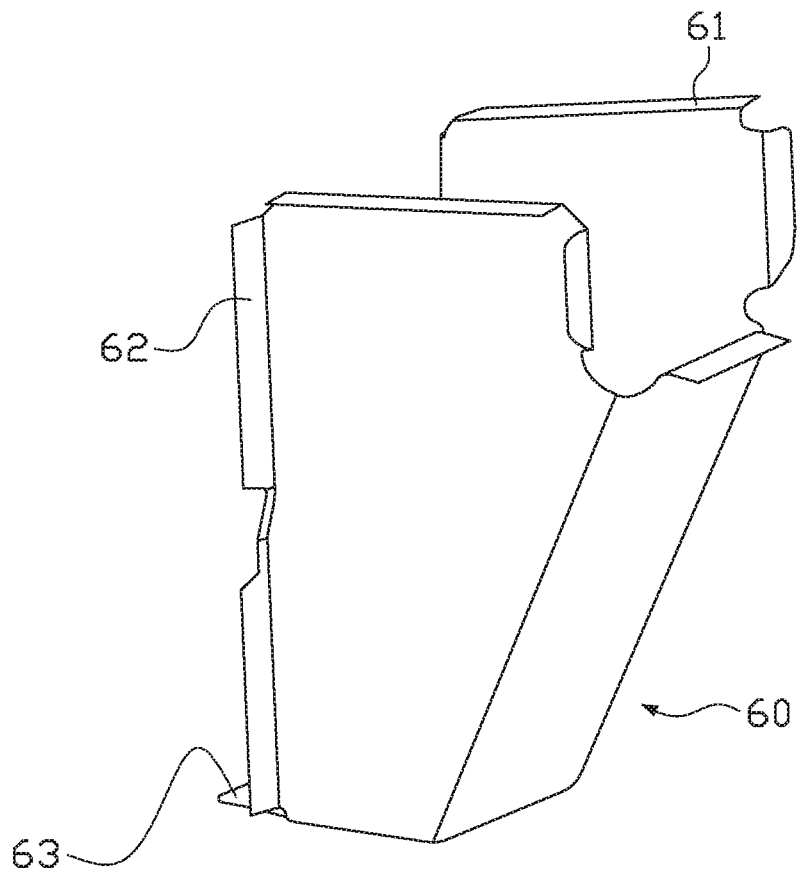
FIG. 5 is a schematic, isometric view showing a connecting pillar of FIG. 2.

Referring to FIG. 5, the connecting supporting member 60 is shaped like a right-angled trapezoid from a side view thereof (or, from a front view of the vehicle). The connecting supporting member 60 includes a first connecting portion 61 connected to the upper longitudinal beam 30, a second connecting portion 62 connected to the middle longitudinal beam 40, and a third connecting portion 63 connected to the front subframe 70. The first connecting portion 61 is perpendicular to the second connecting portion 62, and the first connecting portion 61 is parallel to the third connecting portion 63. Particularly, the upper longitudinal beam 30 is located above the connecting supporting member 60, and a bottom surface of the third portion 33 is welded to the first connecting portion 61 of the connecting supporting member 60. The middle longitudinal beam 40 is also located above the connecting supporting member 60, and an outer surface of an inner side plate of the middle longitudinal beam 40 is welded to the second connecting portion 62 of the connecting supporting member 60. The front subframe 70 is located under the connecting supporting member 60, and a top surface of the front subframe 70 is threadedly connected to the third connecting portion 63 of the connecting supporting member 60.

Referring to FIG. 2, the front subframe 70 includes a front crossbar 71, two longitudinal bars 72, a rear crossbar 73, and two connecting brackets 74. The front crossbar 71 is located below the bumper beam 90, and the front crossbar 71 is disposed more closer to the passenger compartment in contrast to the bumper beam 90. The front crossbar 71, the two longitudinal bars 72 and the rear crossbar 73 are welded together and cooperatively form a "{" shaped structure. That is, two ends of the front crossbar 71 are connected to the two longitudinal bars 72 respectively, two ends of the rear crossbar 73 are connected to the two longitudinal bars 72 respectively, the front crossbar 71 has a shape of "—", each longitudinal bar 72 has a shape of "|", and the rear crossbar 73 has a shape of "—". The connecting bracket 74 is located above a connecting position between the front crossbar 71 and the longitudinal bar 72, and the connecting bracket 74 is connected to the connecting supporting member 60 by bolts. The rear crossbar 73 transverses across rear portions of the longitudinal bars 72, and rear ends of the longitudinal bars 72 are welded to the floor longitudinal beams 50, with the welding points under the floor of the passenger compartment.

Seen from a side view, the bumper beam, the energy absorbing box and the middle longitudinal beam 40 cooperatively form a structure having a shape of "|", the connecting supporting member 60 has a shape of "—", the front subframe 70 has a shape of "/", the upper longitudinal beam 30 has a shape of "\", the "|" shaped structure and the "—" shaped connecting supporting member 60 cross, and the "/" shaped front subframe 70 and the "\" shaped upper longitudinal beam 30 are disposed at two sides of the "|" shaped structure respectively. Therefore, in the vehicle engine compartment assembly described above, the bumper beam 90, the energy absorbing box 80, the upper longitudinal beam 30, the middle longitudinal beam 40, the connecting supporting member 60 and the front subframe 70 cooperatively form a stable structure having a shape of "木" from a side view of the vehicle engine compartment assembly, as shown in FIG. 3. Seen from a top view, two energy absorbing boxes 80 are separately disposed in the front of the front subframe 70, the bumper beam 90 is disposed in the front of the energy absorbing boxes 80, the bumper beam 90 having a shape of "—", each energy absorbing box 80 having a shape of "|", and a part of the front subframe 70 having a shape of "—", resulting in that the bumper beam 90, the energy absorbing box 80 and a part of the front subframe 70 cooperatively form a structure having a shape of "☐". Seen from a top view, two structures each having a shape of "☐" result from that two upper longitudinal beams 30 are disposed at two opposite outer sides of two middle longitudinal beams 40, each of two connecting supporting members 60 connect one upper longitudinal beam 30 and one middle longitudinal beam 40, the upper longitudinal beam 30 and the middle longitudinal beam 40 each has a shape of "|", and each connecting supporting member 60 has a shape of "—". Therefore, the bumper beam 90 and the energy absorbing box 80 are disposed in the front of the front subframe 70, the upper longitudinal beam 30 is disposed at the outer side of the middle longitudinal beam 40, and the middle longitudinal beam 40 and the upper longitudinal beam 30 are connected to the front subframe 70 via the connecting supporting member 60 and the connecting bracket 74, whereby a "品" shaped stable structure is formed by these components as viewed from a top view of the vehicle engine compartment assembly, as shown in FIG. 4.

The structure of the vehicle engine compartment assembly is described above in detail. The improvement of crushing strength of the vehicle engine compartment assembly is theoretically analyzed as follow.

For beams, during an axial crushing, an average load is calculated according to formula 1.

$$P_m = 9.5675 \left( \frac{b+d}{2t} \right)^{\frac{1}{3}} t^2 \sigma_b \tag{1}$$

wherein:
b stands for a length of a cross-section of a rectangular thin-wall tubular beam;
d stands for a width of the cross-section of the rectangular thin-wall tubular beam;
t stands for a thickness of the rectangular thin-wall tubular beam; and
$\sigma_b$ stands for the ultimate tensile strength of the rectangular thin-wall tubular beam.

When the beam is bent to deform, an average load is about 40% of the load having an axial crushing only. Therefore, if the axial crushing strength of the beam is ensured, an energy absorbing performance of the beam will be greatly improved.

To ensure the axial crushing strength of the beam, a bending strength should be improved. A criterion of determining a bending failure for a beam is as follow.

$$Mf = FL \leq [M] = W\sigma\gamma, \quad (2)$$

wherein:
F stands for a force;
L stands for an arm of the force;
σγ stands for a bending stress of the material;
W stands for section modulus in bending.

$$W = \frac{2L_z}{b} \quad (3)$$

$$L_z = \frac{bd^3}{12} - \frac{(b-2t)(d-2t)^3}{12}$$

wherein:
b stands for a length of a cross-section of a rectangular thin-wall tubular beam;
d stands for a width of the cross-section of the rectangular thin-wall tubular beam;
t stands for a thickness of the rectangular thin-wall tubular beam.

As shown from Formula 2 and Formula 3, the bending strength of a cross-section depends on the length, the width and the thickness of the cross-section, and the cross-section is collapsed or not depends directly on the force acting on the cross-section and the arm of the force. Therefore, in order to improve the energy absorbing efficiency of the vehicle engine compartment assembly, the axial crushing strength and the bending strength of the vehicle engine compartment assembly should be improved, or a bending moment of the vehicle engine compartment assembly is offset by counterforce.

Figure 6:
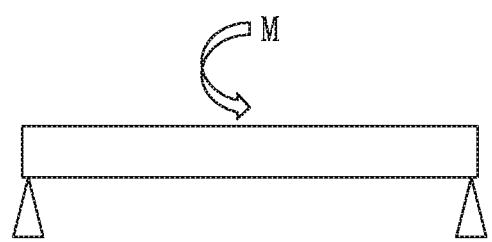
FIG. 6 is a schematic view showing load conditions of an upper longitudinal beam of the vehicle engine compartment assembly of FIG. 2.

In the present invention, the connecting supporting member 60 is added between the upper longitudinal beam 30 and the middle longitudinal beam 40, to connect the upper longitudinal beam 30 with the middle longitudinal beam 40, whereby a force loading state of the upper longitudinal beam 30 is shown in FIG. 6. As shown in FIG. 6, the connecting supporting member 60 provides a supporting counterforce to the upper longitudinal beam 30, and decreases a bending moment M, thereby improving the bending strength of the upper longitudinal beam 30. For the same reason, the front subframe 70 is connected to the middle longitudinal beam 40 via the connecting supporting member 60, to improve the bending strength of the front subframe 70. Therefore, a stability of the front subframe 70 is ensured and the axial crushing strength in collision is improved, such that the energy absorbing capability and the energy absorbing efficiency of the vehicle engine compartment assembly are totally improved.

The operating theory of the vehicle engine compartment assembly in head-on collision is described as follow.

Figure 7:
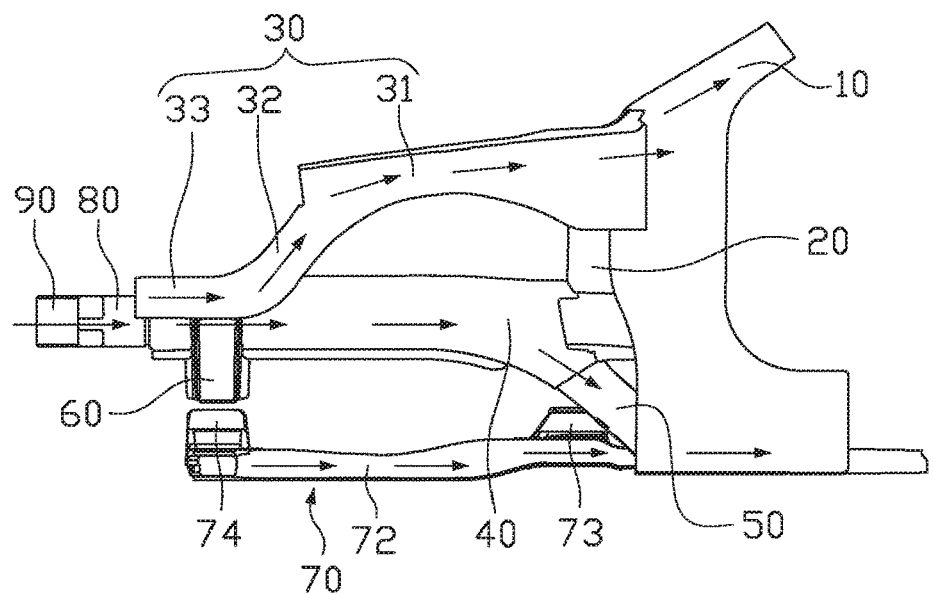
FIG. 7 is a schematic view showing load transfer paths of the vehicle engine compartment assembly of FIG. 2 when subject to head-on collision.

Referring to FIG. 7, when a head-on collision happens, an impact force acts on the bumper beam 90 firstly, the bumper beam 90 then transfers the impact force to the energy absorbing box 80 and the front portion of the middle longitudinal beam 40. Simultaneously, the impact force is transferred from the middle longitudinal beam 40 to the upper longitudinal beam 30 and the longitudinal bars 72 through the connecting supporting member 60. Therefore, during the head-on collision, the impact force is transferred to the beam structures at a rear side of the vehicle engine compartment assembly by three load transfer paths, such that the impact force is transferred by the frame structure as a whole, thereby avoiding a single beam structure to be unstable due to an exceeded force being applied thereon. Also, the impact energy is distributed uniformly on the three load transfer paths. That is, the impact force of head-on collision can be distributed uniformly along the three load transfer paths using the "木" shaped structure of the present invention. The "木" shaped structure can keep stable, such that either one of the three load transfer paths is prevented from becoming unstable when bending to cause loss of force transferring capability and energy absorbing capability. That is, the "木" shaped structure is stable, so that a single load transfer path suffers an axial crushing.

The operating theory of the vehicle engine compartment assembly when collided with small overlapping rates and in different angles is described as follow.

Figure 8:
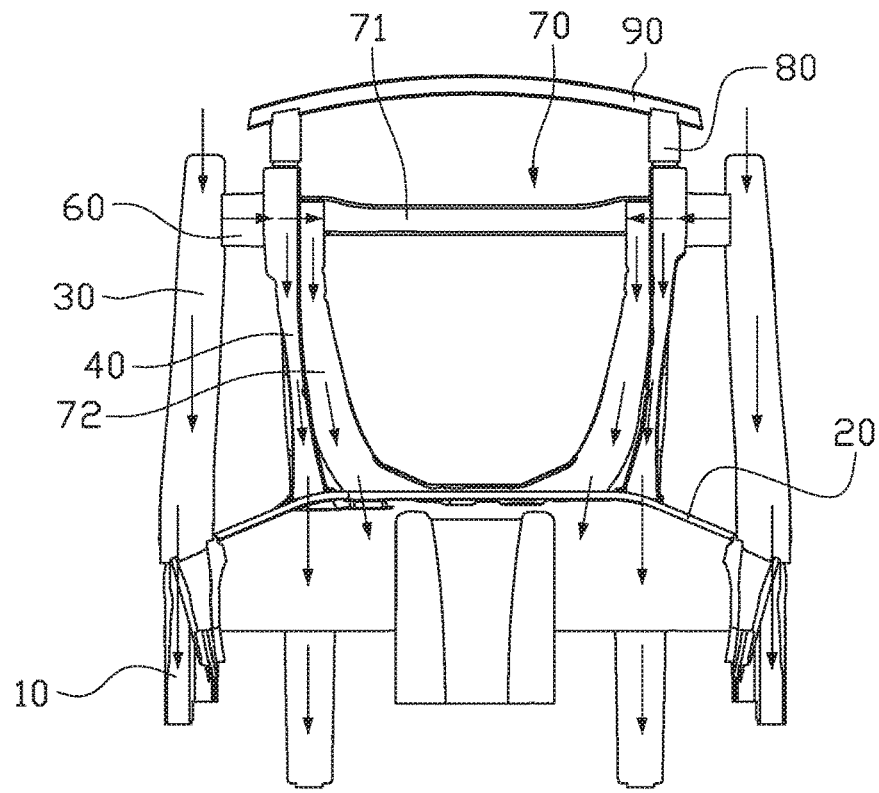
FIG. 8 is a schematic view showing load transfer paths of the vehicle engine compartment assembly of FIG. 2 when subject to collisions with a small overlap ratio and from different angles.

Referring to FIG. 8, when a collision happens with small different overlapping rates and from different angles, i.e., only a minority portion of the front of the vehicle is collided by an obstacle, the obstacle firstly collides on the upper longitudinal beam 30 located at outer side of the "品" shaped structure. The upper longitudinal beam 30 transfers the impact force to the middle longitudinal beam 40 and the longitudinal bars 72 through the connecting supporting member 60. Most of the impact force is applied on the upper longitudinal beam 30, and the rest of the impact force is applied on the middle longitudinal beam 40 and the longitudinal bars 72. Due to the connecting supporting member 60, the upper longitudinal beam 30, the middle longitudinal beam 40 and the front subframe 70 are connected together and cooperatively form a closed frame structure, to avoid forming an unstable cantilever structure. Therefore, when a collision happens with different overlapping rates and in different angles, the three load transfer paths are all capable of enduring the impact force, such that the vehicle engine compartment assembly can absorb most of the impact energy, to thereby ensure the passenger compartment stable and protect the passenger from being injured.

The operating theory of the vehicle engine compartment assembly when applied in different vehicle models is described as follow.

Figure 9A:
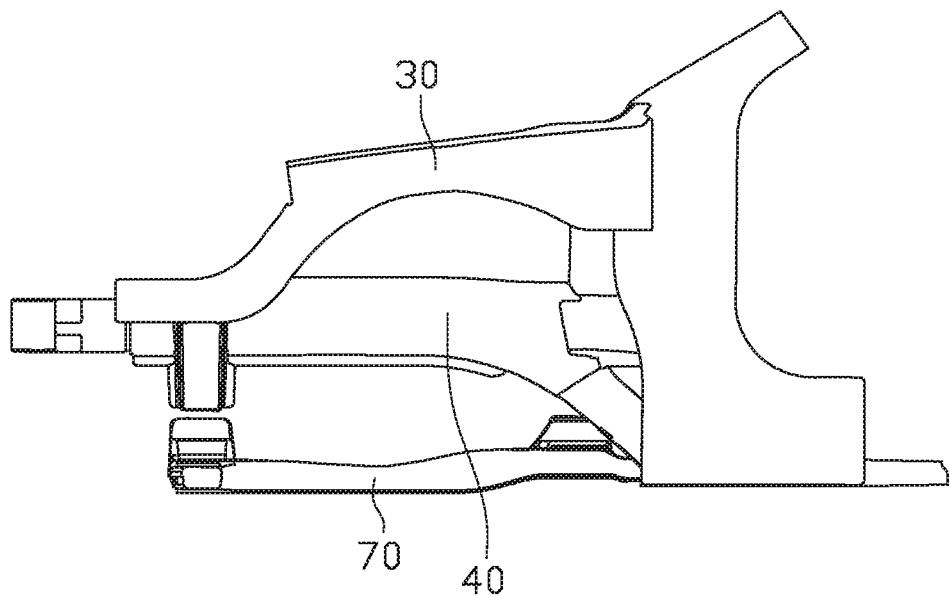
FIG. 9a and FIG. 9b are schematic views showing the vehicle engine compartment assembly of FIG. 2 employed in vehicle models with different weights.
Figure 9B:
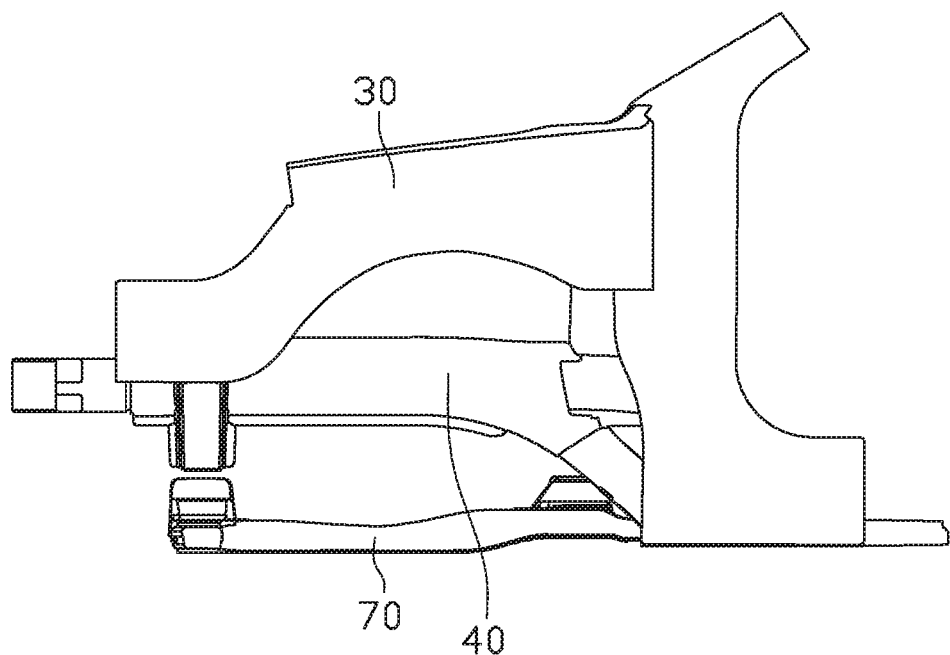

FIG. 9a is a schematic view showing the vehicle engine compartment assembly of the present invention applied in a vehicle model A, and FIG. 9b is a schematic view showing the vehicle engine compartment assembly of the present invention applied in a vehicle model B, it is assumed that the vehicle model B is heavier than the vehicle model A. When the vehicle engine compartment assembly is adapted to be applied in the vehicle model B from the vehicle model A, due to a requirement change of collision performance, it is concluded that the energy absorbing capability of the upper longitudinal beam 30 is required to be increased after conducting a theoretical calculation plus simulation. To increase the energy absorbing capability of the upper longitudinal beam 30, only a cross-section of the upper longitudinal beam 30 needs to be enlarged and other structures are general parts without being changed. As a result, the collision performance is changed, and a lateral distance of the upper longitudinal beams 30 of the left and the right sides can be kept unchanged along a lateral direction of the vehicle, such that more space is spared for the arrangement of a power assembly with improved flexibility, and it is achieved that different vehicle models can almost use the same structure.

As seen from the above description, the vehicle engine compartment assembly of the present invention has at least one of the following advantages.

1. In the vehicle engine compartment assembly of the present invention, the middle longitudinal beam 40 is added between the upper longitudinal beam 30 and the front subframe 70, and the upper longitudinal beam 30, the middle longitudinal beam 40 and the front subframe 70 are connected via the connecting supporting member 60, such that a structure of the vehicle engine compartment assembly is changed from a structure having a shape of "人" in the prior art to a structure having a shape of "木" in the present invention, to strengthen the frame structure of the vehicle engine compartment assembly. When the vehicle suffers collision at a high speed, the stable structure formed by the three load transfer paths can improve the energy absorption of the vehicle engine compartment assembly, so that the vehicle engine compartment assembly remains stable when a front of the vehicle is collided, to avoid any one of the load transfer paths from becoming unstable as a result of bending due to suffering different impact forces.

2. In the vehicle engine compartment assembly of the present invention, the "品" shaped stable structure makes a distance between the upper longitudinal beam 30 and the middle longitudinal beam 40 to be relatively large, so that the upper longitudinal beam 30 can extend more outside in a lateral direction of the vehicle to get into contact with the obstacle more earlier. Thus, the vehicle engine compartment assembly of the present invention can confront collisions in smaller angles as compared with the prior art. When the vehicle suffers collisions with small overlap ratios or from different angles, at least one of the load transfer paths can absorb the energy adequately. The "品" shaped structure formed by the upper longitudinal beam 30, the middle longitudinal beam 40 and the front subframe 70 can distribute the impact force to the other load transfer paths, to thereby improve the bending strength of the upper longitudinal beam 30, the middle longitudinal beam 40 and the front subframe 70, such that the force load on the whole structure is more reasonable, and the axial crushing performance and the energy absorbing performance of the vehicle engine compartment assembly are improved, which is helpful to improve the stability of the passenger compartment and the safety of the vehicle.

3. When the vehicle engine compartment assembly collides with a high object such as a truck, the upper longitudinal beam 30 of the "木" shaped structure deforms to absorb energy adequately, and the whole structure is capable of transferring the impact force to the other load transfer paths, to thereby ensure its integrity of the passenger compartment.

4. When the "木" shaped structure suffers a collision, the three load transfer paths can realize a stable energy absorbing effect. Thus, the proportion of energy absorption can be allocated reasonably between the three load transfer paths, and the cross-section areas of the three load transfer paths are accordingly designed according to the proportion of energy absorption, so that the vehicle engine compartment can be designed more flexibly when the layout requirement of the vehicle engine compartment is meet.

5. In the vehicle engine compartment assembly of the present invention, when the middle longitudinal beam 40 remains unchanged, the cross section of the upper longitudinal beam 30 or the front subframe 70 can be enlarged to improve energy absorption of the upper longitudinal beam 30 or the front subframe 70, to meet the collision requirements of vehicle models with different weight and realize the purpose of more structural parts being universal in different vehicle models.

6. The crashing box 80 protruded out from the front of the vehicle engine compartment assembly of the present invention can absorb the impact energy adequately when a low speed collision happens, to protect the middle longitudinal beam 40, the upper longitudinal beam 30 and the front subframe 70 from being damaged. After the crashing box 80 is damaged, it can be fixed conveniently by detaching and mounting bolts, such that the damage in low speed collisions can be repaired easily.

7. In the vehicle engine compartment assembly of the present invention, the front portion of the upper longitudinal beam 30 extends forward beyond the middle longitudinal beam 40, so that the upper longitudinal beam 30 comes into contact with the obstacle earlier to absorb energy when a collision happens.

8. The frame structure formed by the vehicle engine compartment assembly of the present invention is "木" shaped as viewed from a side view and "品" shaped as viewed from a top view, which is helpful to improve the whole rigidity of the vehicle engine compartment assembly. The NVH (Noise, Vibration, and Harshness) performance and the lightweight level of the vehicle engine compartment assembly are improved.

In this description, the term "include", or any of its variants, is intended to cover non-exclusive inclusion, except for the elements listed, also including other elements that are not explicitly listed.

In this description, the orientation words "front", "back", "up", "down", "left", "right", etc., are defined by the position of the parts in the drawing for the purpose of clarity and convenience. It is understood that, the orientation words should not be deemed as limitations to the scope of the present disclosure.

In the case of no conflict, the above examples and the features in the examples can be combined with each other.

The above are embodiments of the present disclosure only, and should not be deemed as limitations to the scope of the present disclosure. It should be noted that variations and improvements will become apparent to those skilled in the art to which the present disclosure pertains. Therefore, the scope of the present disclosure is defined by the appended claims.

INDUSTRIAL APPLICABILITY

1. In the vehicle engine compartment assembly of the present invention, the middle longitudinal beam 40 is added between the upper longitudinal beam 30 and the front subframe 70, and the upper longitudinal beam 30, the middle longitudinal beam 40 and the front subframe 70 are connected via the connecting supporting member 60, such that a structure of the vehicle engine compartment assembly is changed from a structure having a shape of "人" in the prior art to a structure having a shape of "木" in the present invention, to strengthen the frame structure of the vehicle engine compartment assembly. When the vehicle suffers collision at a high speed, the stable structure formed by the three load transfer paths can improve the energy absorption of the vehicle engine compartment assembly, so that the vehicle engine compartment assembly remains stable when a front of the vehicle is collided, to avoid any one of the load transfer paths from becoming unstable as a result of bending due to suffering different impact forces.

2. In the vehicle engine compartment assembly of the present invention, the "品" shaped stable structure makes a distance between the upper longitudinal beam 30 and the middle longitudinal beam 40 to be relatively large, so that the upper longitudinal beam 30 can be located more outside in a lateral direction of the vehicle to get into contact with the obstacle more earlier. Thus, the vehicle engine compartment assembly of the present invention can confront collisions in smaller angles as compared with the prior art. When the vehicle suffers collisions with small overlap ratios or from different angles, at least one of the load transfer paths can absorb the energy adequately. The "品" shaped structure formed by the upper longitudinal beam 30, the middle longitudinal beam 40 and the front subframe 70 can distribute the impact force to the other load transfer paths, to thereby improve the bending strength of the upper longitudinal beam 30, the middle longitudinal beam 40 and the front subframe 70, such that the force load on the whole structure is more reasonable, and the axial crushing performance and the energy absorbing performance of the vehicle engine compartment assembly are improved, which is helpful to improve the stability of the passenger compartment and the safety of the vehicle.

3. When the vehicle engine compartment assembly collides with a high object such as a truck, the upper longitudinal beam 30 of the "木" shaped structure deforms to absorb energy adequately, and the whole structure is capable of transferring the impact force to the other load transfer paths, to thereby ensure its integrity of the passenger compartment.

4. When the "木" shaped structure suffers a collision, the three load transfer paths can realize a stable energy absorbing effect. Thus, the proportion of energy absorption can be allocated reasonably between the three load transfer paths, and the cross-section areas of the three load transfer paths are accordingly designed according to the proportion of energy absorption, so that the vehicle engine compartment can be designed more flexibly when the layout requirement of the vehicle engine compartment is meet.

5. In the vehicle engine compartment assembly of the present invention, when the middle longitudinal beam 40 remains unchanged, the cross section of the upper longitudinal beam 30 or the front subframe 70 can be enlarged to improve energy absorption of the upper longitudinal beam 30 or the front subframe 70, to meet the collision requirements of vehicle models with different weight and realize the purpose of more structural parts being universal in different vehicle models.

6. The crashing box 80 protruded out from the front of the vehicle engine compartment assembly of the present invention can absorb the impact energy adequately when a low speed collision happens, to protect the middle longitudinal beam 40, the upper longitudinal beam 30 and the front subframe 70 from being damaged. After the crashing box 80 is damaged, it can be fixed conveniently by detaching and mounting bolts, such that the damage in low speed collisions can be repaired easily.

7. In the vehicle engine compartment assembly of the present invention, the front portion of the upper longitudinal beam 30 extends forward beyond the middle longitudinal beam 40, so that the upper longitudinal beam 30 comes into contact with the obstacle earlier to absorb energy when a collision happens.

8. The frame structure formed by the vehicle engine compartment assembly of the present invention is "木" shaped as viewed from a side view and "品" shaped as viewed from a top view, which is helpful to improve the whole rigidity of the vehicle engine compartment assembly. The NVH (Noise, Vibration, and Harshness) performance and the lightweight level of the vehicle engine compartment assembly are improved.

What is claimed is:

1. A vehicle engine compartment assembly, comprising an upper longitudinal beam and a front subframe disposed under the upper longitudinal beam, wherein the vehicle engine compartment assembly further comprises a middle longitudinal beam and a connecting supporting member, the middle longitudinal beam is disposed between the upper longitudinal beam and the front subframe, and the connecting supporting member is connected to each of the middle longitudinal beam, the upper longitudinal beam and the front subframe.

2. The vehicle engine compartment assembly according to claim 1, wherein the vehicle engine compartment assembly further comprises an energy absorbing box disposed in the front of the upper longitudinal beam and a bumper beam disposed in the front of the energy absorbing box; seen from a side view, the bumper beam, the energy absorbing box and the middle longitudinal beam cooperatively form a structure having a shape of "|", the connecting supporting member has a shape of "—", the front subframe has a shape of "/", the upper longitudinal beam has a shape of "\", the "|" shaped structure and the "—" shaped connecting supporting member cross, and the "/" shaped front subframe and the "\" shaped upper longitudinal beam are disposed at two sides of the "|" shaped structure respectively, thus the bumper beam, the energy absorbing box, the upper longitudinal beam, the middle longitudinal beam, the connecting supporting member and the front subframe cooperatively form a structure having a shape of "木" from a side view of the vehicle.

3. The vehicle engine compartment assembly according to claim 2, wherein seen from a top view, two energy absorbing boxes are separately disposed in the front of the front subframe, the bumper beam is disposed in the front of the energy absorbing boxes, the bumper beam having a shape of "—", each energy absorbing box having a shape of "|", and a part of the front subframe having a shape of "—", resulting in that the bumper beam, the energy absorbing box and a part of the front subframe cooperatively form a structure having a shape of "□";

seen from a top view, two structures each having a shape of "□" result from that two upper longitudinal beams are disposed at two opposite outer sides of two middle longitudinal beams, each of two connecting supporting members connect one upper longitudinal beam and one middle longitudinal beam, the upper longitudinal beam and the middle longitudinal beam each has a shape of "|", and each connecting supporting member has a shape of "—";

therefore, the bumper beam, the energy absorbing box, the upper longitudinal beam, the middle longitudinal beam, the connecting supporting member and the front subframe cooperatively form a structure having a shape of "品" from a top view of the vehicle.

4. The vehicle engine compartment assembly according to claim 1, wherein the upper longitudinal beam is disposed at an outer side of the middle longitudinal beam along a lateral direction of the vehicle.

5. The vehicle engine compartment assembly according to claim 1, wherein a front portion of the upper longitudinal beam protrudes out beyond the middle longitudinal beam along a longitudinal direction of the vehicle, the front portion of the upper longitudinal beam protruding out the middle longitudinal beam and an energy absorbing box of the vehicle are located side by side.

6. The vehicle engine compartment assembly according to claim 1, wherein the upper longitudinal beam comprises a first portion, a second portion and a third portion, the first portion is connected to an A-pillar of the vehicle, the third portion is connected to an energy absorbing box of the vehicle, a height of the third portion is lower than a height of the first portion, the second portion is connected between the first portion and the third portion, and the connecting supporting member is connected to the third portion of the upper longitudinal beam.

7. The vehicle engine compartment assembly according to claim 6, wherein the first portion of the upper longitudinal beam is shaped like an inclined line from a side view of the vehicle, the second portion of the upper longitudinal beam is arc-shaped from a side view of the vehicle, and the third portion of the upper longitudinal beam is a horizontal line from a side view of the vehicle.

8. The vehicle engine compartment assembly according to claim 1, wherein the connecting supporting member comprises a first connecting portion connected to the upper longitudinal beam, a second connecting portion connected to the middle longitudinal beam, and a third connecting portion connected to the front subframe, the first connecting portion is perpendicular to the second connecting portion, and the first connecting portion is parallel to the third connecting portion.

9. The vehicle engine compartment assembly according to claim 1, wherein the front subframe comprises a front crossbar, two longitudinal bars and a rear crossbar, the front crossbar, the longitudinal bars and the rear crossbar cooperatively form a "☐" shaped structure, resulting from that two ends of the front crossbar are connected to the two longitudinal bars respectively, two ends of the rear crossbar are connected to the two longitudinal bars respectively, the front crossbar has a shape of "—", each longitudinal bar has a shape of "|", and the rear crossbar has a shape of "—".

10. The vehicle engine compartment assembly according to claim 9, wherein the front subframe further comprises a connecting bracket, the connecting bracket is located above a connecting position between the front crossbar and the longitudinal bar, and the front subframe is threadedly connected to the connecting supporting member via the connecting bracket.

11. The vehicle engine compartment assembly according to claim 10, wherein the middle longitudinal beam and the upper longitudinal beam are connected to the front subframe via the connecting supporting member and the connecting bracket.

12. The vehicle engine compartment assembly according to claim 10, wherein the front crossbar is located below the bumper beam, and the front crossbar is disposed much closer to a passenger compartment in contrast to the bumper beam.

* * * * *